United States Patent [19]

Ikeda

[11] Patent Number: 4,663,730
[45] Date of Patent: May 5, 1987

[54] SEQUENCE CONTROLLER

[75] Inventor: Yoshiaki Ikeda, Hachioji, Japan
[73] Assignee: Fanuc Ltd., Minamitsuru, Japan
[21] Appl. No.: 460,239
[22] PCT Filed: May 20, 1982
[86] PCT No.: PCT/JP82/00183
  § 371 Date: Jan. 17, 1983
  § 102(e) Date: Jan. 17, 1983
[87] PCT Pub. No.: WO82/04139
  PCT Pub. Date: Nov. 25, 1982

[30] Foreign Application Priority Data

May 20, 1981 [JP] Japan ................ 56-076151

[51] Int. Cl.⁴ .............. G06F 15/00; G06F 13/00
[52] U.S. Cl. ..................... 364/900; 364/132; 364/138
[58] Field of Search ... 364/200 MS File, 900 MS File, 364/131, 132, 133, 136, 134, 137, 138, 140

[56] References Cited

U.S. PATENT DOCUMENTS

| | | | |
|---|---|---|---|
| 4,034,354 | 7/1977 | Simmons | 364/900 |
| 4,058,711 | 11/1977 | Ondercin et al. | 364/133 |
| 4,118,771 | 10/1978 | Pomella et al. | 364/134 |
| 4,212,057 | 7/1980 | Devlin et al. | 364/200 |
| 4,215,398 | 7/1980 | Buckett et al. | 364/136 |
| 4,215,399 | 7/1980 | Pavicu et al. | 364/136 |
| 4,228,495 | 10/1980 | Bernhard et al. | 364/136 |
| 4,298,928 | 11/1981 | Etoh et al. | 364/200 |
| 4,351,023 | 9/1982 | Richer | 364/134 X |
| 4,395,758 | 7/1983 | Helenius et al. | 364/200 |
| 4,396,973 | 8/1983 | Imazeki et al. | 364/136 |
| 4,415,965 | 11/1983 | Imazeki et al. | 364/136 |
| 4,459,655 | 7/1984 | Willemin | 364/132 |
| 4,470,109 | 9/1984 | McNally | 364/200 |

FOREIGN PATENT DOCUMENTS

| | | |
|---|---|---|
| 2743492 | 5/1978 | Fed. Rep. of Germany . |
| 2407524 | 5/1979 | France . |
| 2038035 | 7/1980 | United Kingdom . |

OTHER PUBLICATIONS

International Search Report for PCT/JP82/00183.
English Translation of Abstract of Japanese Patent 56-31103.

Primary Examiner—James D. Thomas
Assistant Examiner—Thomas Lee
Attorney, Agent, or Firm—Staas & Halsey

[57] ABSTRACT

Disclosed herein is a sequence controller wherein predetermined sequence processing can be executed by a built-in processor (2) in accordance with data transferred periodically from a processor (1) in a numerical control device (NC). The NC processor generates an interrupt signal (e) each time a transfer of data is completed. On the basis of the interrupt signal, the built-in processor in the sequence controller starts the predetermined sequence processing.

4 Claims, 2 Drawing Figures

SEQUENCE CONTROLLER

BACKGROUND OF THE INVENTION

This invention relates to improvements in a sequence controller which executes sequence processing under the control of a built-in processor and, more particularly, to a sequence controller which, in carrying out sequence processing in accordance with data transferred from another processor, is capable of executing predetermined sequence processing without being affected by the transfer of data.

Conventional sequence controllers, previously constructed of individual items of hardware such as relay circuits, are now being replaced by sequence controllers of the programmable type fashioned around a processor. A sequence controller is operable to control a system by executing prescribed sequence processing in response to directions from a main control unit, the latter also employing a processor.

For example, in a numerical control system for controlling, e.g., a machine tool or a robot, a sequence controller of the type which has an internal numerical control device (referred to as an NC hereinafter) has been developed in which an NC and a sequence controller are each provided with a processor and integrated into one unit. In a system of this kind, the sequence controller has a memory for storing a sequence program for the execution of sequence processing in accordance with M, S and T function instructions transmitted by the NC and is adapted to execute the prescribed sequence processing upon receiving these M, S and T function instructions. The system employs a so-called repetitive operation method wherein the receipt of transferred data and the execution of sequence processing are carried out repeatedly.

If processing could be executed without the sequence controller's own built-in processor and the main processor of the NC being aware of each other in the sequence controller of the above-described type, then it would be possible to lighten the burden on each processor and exploit them more effectively. On the other hand, once the sequence controller has started executing sequence processing, halting such processing is undesirable. For this reason, a system has been considered wherein the completion of sequence processing by the sequence controller (referred to as SC hereinafter) is communicated to the processor on the NC side, whereby data is then transferred from the processor on the NC side to the processor on the SC side so that the SC processor may resume sequence processing. This makes it necessary, however, for the processor on the NC side to monitor the completion of processing by the SC processor, thereby increasing the burden on the NC processor and impeding other processing. Another requirement is synchronization of the transferred data on the SC side.

SUMMARY OF THE INVENTION

Accordingly, an object of the present invention is to provide a sequence controller wherein, in the transfer of data from the NC processor to the SC processor in the sequence controller, processing is executed without the two processors directly interacting enabling each processor to be utilized effectively.

According to the present invention, predetermined sequence processing is executed by a built-in processor in a sequence controller in accordance with data transferred periodically from a processor of an NC. The NC processor generates an interrupt signal each time a transfer of data is completed. Upon receipt of the interrupt signal, the processor built in the sequence controller starts the predetermined sequence processing. According to the present invention, data is transferred from the processor on the NC side at a predetermined period that is decided in advance by the expected sequence cycle, so that the NC processor is capable of tranferring data without being affected by any variance in the cycle of the processor built in the sequence controller. Moreover, the rate of transfer of input signals is decided solely by the predetermined period. Furthermore, according to the invention, an interrupt signal is generated at the end of sequence processing upon completion of data transfer, whereby sequence processing is resumed by the built-in processor in the sequence controller. The built-in processor therefore does not require input signal synchronization and can execute its own sequence processing without being affected at all by the data transfer from the NC processor. Immediately upon the completion of sequence processing, moreover, processing can be resumed in response to the interrupt signal from the NC processor, so that the built-in processor on the SC side waits for only a short time.

DESCRIPTION OF THE PREFERRED EMBODIMENT

Figure 1:
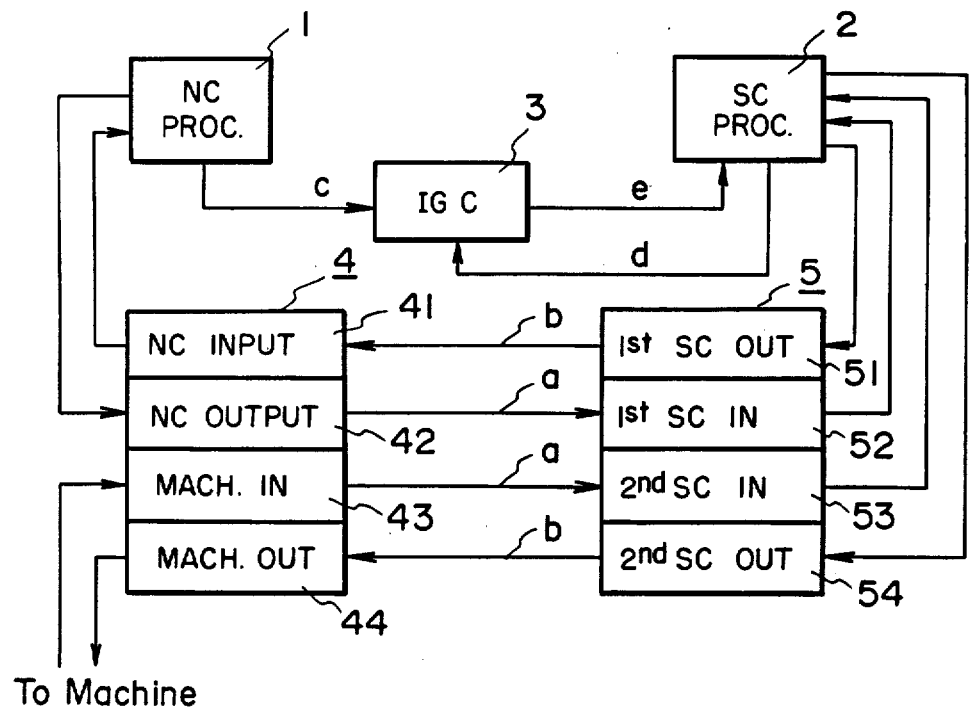
FIG. 1 is a block diagram of the present invention.

The present invention will now be described in detail with reference to the drawings. In FIG. 1, numeral 1 denotes a numerical control (NC) processor which executes numerical control based on a machining command input signal from, e.g., a paper tape or memory (not shown). The NC processor 1 transfers command data indicative of M, S and T function instructions and the like to the sequence controller and receives process data transferred from the sequence controller. Numeral 2 denotes a sequence controller (SC) processor for executing sequence processing based on the command data from the NC processor 1, and for delivering the result of sequence processing to a machine (not shown). The execution of sequence processing is not interrupted until the end of one cycle. Upon receiving an input signal from the machine, the SC processor 2 executes predetermined processing and delivers the result to the NC. The time required for sequence processing (the processing time for one cycle) is subject to variance depending upon the input signal and sequence command, and therefore is not constant. The processors 1 and 2 are are both microprocessors.

Numeral 3 denotes an interrupt generating circuit (IGC) the function of which will be described later. Numeral 4 denotes a numerical control (NC) buffer. The NC buffer has four areas or registers, namely an NC input area 41 for receiving data from a sequence controller (SC) buffer (described later) and for transmitting this data to the NC processor 1, an NC output area 42 for transmitting, to the SC buffer, data received from the NC processor 1, a machine input area 43 for transmitting an input signal from the machine to the SC buffer, and a machine output area 44 for transmitting data from the SC buffer to the machine.

Numeral 5 denotes the SC buffer. The SC buffer 5 likewise has four areas or registers, namely a first SC output area 51 for transmitting data from the SC processor 2 to the NC input area 41, a first SC input area 52 for transmitting data from the NC output area 42 to the SC processor 2, a second SC input area 53 for transmitting a signal from the machine input area 43 to the SC processor 2, and a second SC output area 54 for transmitting data from the SC processor 2 to the machine output area 44.

The operation and effects of the invention will now be described. First, we shall assume that command data from the NC processor 1 is loaded in the area 42 of buffer 4 and then transferred from area 42 of buffer 4 to area 52 of buffer 5, and that the processor 2 reads the data from area 52 of buffer 5 to execute sequence processing. Similarly, we shall assume that an input signal from the machine is loaded in the area 43 of buffer 4 and then transferred from area 43 of buffer 4 to area 53 of buffer 5, and that the processor 2 reads the signal from area 53 of buffer 5 to execute sequence processing. We shall also assume that, conversely, data from the processor 2 to the NC and to the machine are loaded into areas 51 and 54 of buffer 5 and then transferred from areas 51 and 54 of buffer 5 to areas 41 and 44 of buffer 4, respectively, and that the NC processor 1 reads the data from area 41, while the data in area 44 is transmitted to the machine.

Figure 2:
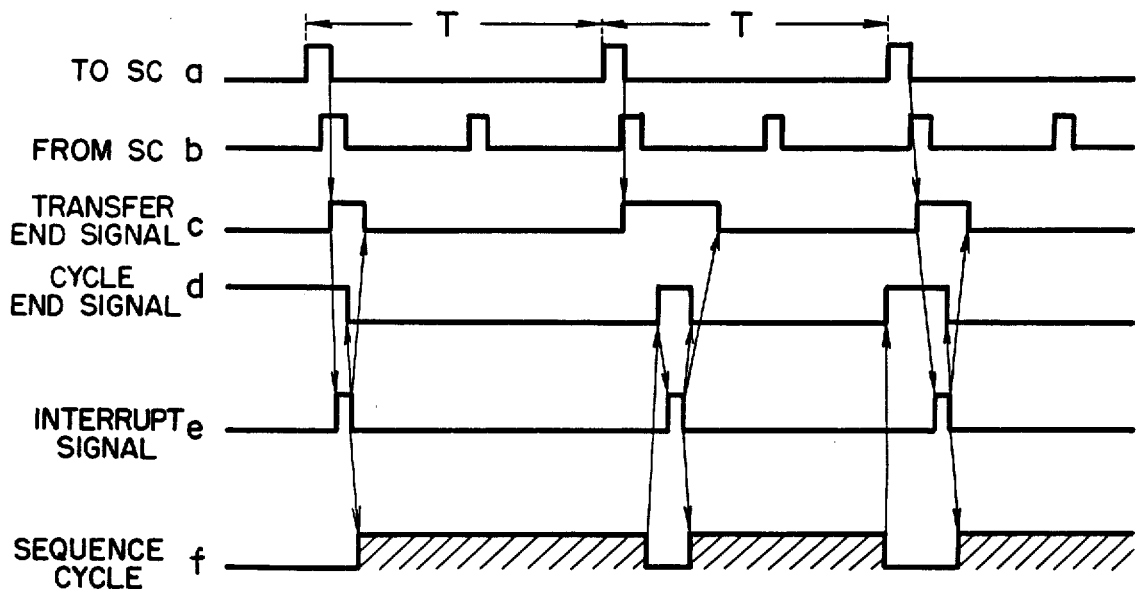
FIG. 2 is a timing chart associated with the block diagram of FIG. 1.

Next, continuing the description with reference to FIG. 2, assume that the period for a transfer of data from the NC processor 1 to the SC processor 2 is a constant period T, as illustrated on row a. In other words, data is transferred from buffer 4 to buffer 5 at regular intervals equivalent to the period T.

Here the transfer period T is assumed to be equivalent to one cycle of sequence processing executed by the sequence controller. In a case where this processing cycle is subject to variance, as mentioned above, we shall assume that the length of the transfer period T, is somewhat greater than the mean time of a processing cycle.

Since it suffices for the NC processor 1 to execute a transfer at the period T, the burden on the processor is very light. Moreover, sequence processing executed by the sequence controller is completely unaffected. Meanwhile, the period for the transfer of data from SC processor NC 2 to processor 1 is as indicated on row b. This period is shorter than the transfer period T and is decided by the specifications of the sequence.

The NC processor 1, with the completion of data transfer, delivers a transfer end signal c to the interrupt generating circuit 3. The SC processor 2, upon completing the current cycle of sequence processing, sends a cycle end signal d to the interrupt generating circuit 3. In FIG. 2, the end of the cycle is indicated when the cycle end signal d assumes the high logic level.

When the transfer end signal c and cycle end signal d are both high, the interrupt signal generating circuit 3 generates an interrupt signal e. The interrupt signal e is transmitted to the processor 2, in response to which the processor 2 returns to the beginning of the sequence to resume the predetermined sequence processing.

In FIG. 2, f represents the sequence cycle in the operational state. It will be seen that the cycle end signal is not produced in cases where the sequence cycle is prolonged beyond the period T, so that the interrupt signal is not generated. The interrupt signal is generated at such time that the cycle end signal is produced at the end of the cycle. Thus, the generation of the interrupt signal is delayed until the cycle is completed.

The simplest construction for the interrupt generating circuit 3 is an AND circuit. Also, by providing the circuit with flip-flops or the like and arranging it so that trigger signals are received from the processors 1 and 2, the transfer end and cycle end signals can be reset by the circuit itself. It is also possible for the particular arrangement to be modified in various ways as required. Accordingly, the SC processor 2 does not especially require synchronization of the input signals, and sequence processing may be executed without disturbance.

According to the present invention as described above, data is transferred from the NC processor 1 at a predetermined period T decided beforehand by the expected sequencing cycle. The NC processor 1 can therefore perform the data transfer to the SC processor 1 without being affected at all by any variance in the cycle of the SC processor 2 built in the sequence controller. The rate of transfer of input signals, moreover, is decided solely by the period T. Furthermore, according to the invention, the interrupt signal e is generated at the end of sequence processing upon completion of data transfer, whereby sequence processing is resumed by the SC processor 2 built in the sequence controller. The built-in processor 2 therefore does not require input signal synchronization and can execute its own sequence processing without being affected at all by the data transfer from the NC processor 1. Immediately upon the completion of sequence processing, moreover, processing can be resumed in response to the externally applied interrupt signal. This has an important practical result in that the SC processor 2 is waiting for only a short time.

While the present invention has been described with reference to a single embodiment, it will be understood that various modifications may be made in accordance with the gist of the invention and that all such modifications fall within the scope of the invention.

The sequence controller according to the present invention is well-suited for use in transmitting data from a numerical control device for controlling, e.g., a machine tool or robot, to a processor built in the sequence controller.

I claim:

1. A sequence controller executing sequence processing, comprising:
    built-in processor means for performing the sequence processing in dependence upon sequence processing data and generating a cycle end signal upon completion of a cycle of the sequence processing; and
    main processor means, connected to said built-in processor means, for generating and transferring the sequence processing data to said built-in processor means regardless of whether the sequence processing is being performed, generating a transfer end signal, independently of the cycle end signal, indicating completion of the transfer of the sequence processing data and generating an interrupt signal in response to the transfer end signal and the cycle end signal, said built-in processor means starting predetermined sequence processing upon receiving the interrupt signal.

2. A sequence controller executing sequence processing, comprising:

built-in processor means for performing the sequence processing in dependence upon sequence processing data, comprising:
  a sequence controller processor for controlling the sequence processing and generating a cycle end signal indicating completion of a cycle of predetermined sequence processing; and
  a sequence controller buffer connected to said sequence control processor; and
main processor means for generating and transferring the sequence processing data to said built-in processor means regardless of whether the processing is being performed, comprising:
  a numerical control processor for performing numerical control and generating a transfer end signal independently of the cycle end signal, the transfer end signal indicating completion of the transfer of the sequence processing data;
  a numerical control buffer connected to said numerical control processor and said sequence controller buffer; and
  an interrupt generating circuit, connected to said sequence controller processor and said numerical control processor, for generating an interrupt signal in response to the transfer end signal and the cycle end signal, said built-in processor means starting the predetermined sequence processing upon receiving the interrupt signal.

3. A sequence controller according to claim 2, wherein said interrupt generating circuit ANDs the transfer end signal and the cycle end signal to generate the interrupt signal.

4. A sequence controller according to claim 2,
wherein a machine is controlled by the numerical control performed by said numerical control processor,
wherein said sequence controller buffer comprises:
  first and second sequence controller input registers connected to said sequence controller processor; and
  first and second sequence controller output registers connected to said sequence controller processor, and
wherein said numerical control buffer comprises:
  a numerical control input register connected to said numerical control processor and said first sequence controller output register;
  a numerical control output register connected to said numerical control processor and said first sequence controller input register;
  a machine input register connected to the machine and said second sequence controller input register; and
  a machine output register connected to the machine and said second sequence controller output register.

* * * * *